(12) United States Patent
Girondi

(10) Patent No.: US 9,631,590 B2
(45) Date of Patent: Apr. 25, 2017

(54) FILTER CARTRIDGE PROVIDED WITH MEANS FOR EXPULSION OF WATER AND A RELATIVE FILTER GROUP

(71) Applicant: UFI FILTERS S.P.A., Porto Mantovano (MN) (IT)

(72) Inventor: Giorgio Girondi, Mantova (IT)

(73) Assignee: UFI FILTERS S.P.A., Porto Mantovano (MN) (IT)

( * ) Notice: Subject to any disclaimer, the term of this patent is extended or adjusted under 35 U.S.C. 154(b) by 0 days.

(21) Appl. No.: 14/434,329

(22) PCT Filed: Sep. 24, 2013

(86) PCT No.: PCT/IB2013/002118
§ 371 (c)(1),
(2) Date: Apr. 8, 2015

(87) PCT Pub. No.: WO2014/057323
PCT Pub. Date: Apr. 17, 2014

(65) Prior Publication Data
US 2015/0267658 A1 Sep. 24, 2015

(30) Foreign Application Priority Data

Oct. 11, 2012 (IT) .............................. RE2012A0066

(51) Int. Cl.

| F02M 37/22 | (2006.01) |
|---|---|
| B01D 35/02 | (2006.01) |
| B01D 36/00 | (2006.01) |
| B01D 29/58 | (2006.01) |

(52) U.S. Cl.
CPC ........... *F02M 37/221* (2013.01); *B01D 29/58* (2013.01); *B01D 35/02* (2013.01); *B01D 36/003* (2013.01);
(Continued)

(58) Field of Classification Search
CPC .... F02M 37/221; F02M 37/22; B01D 35/005; B01D 36/006; B01D 2201/291;
(Continued)

(56) References Cited

U.S. PATENT DOCUMENTS 2,220,706 A * 11/1940 Cantin .................. B01D 35/12
210/132
5,462,658 A * 10/1995 Sem ........................ B01D 27/08
210/172.1

(Continued)

FOREIGN PATENT DOCUMENTS

DE 202008016623 U1 4/2010
IT WO 2012104698 A1 * 8/2012 ........... B01D 35/147
(Continued)

*Primary Examiner* — David C Mellon
*Assistant Examiner* — Liam Royce
(74) *Attorney, Agent, or Firm* — Volpe and Koenig, P.C.

(57) ABSTRACT

A filter cartridge (30) for filtering fuel, comprising a filter wall (31) having a tubular shape, a first support plate (32) fixed to an end of the filter wall (31) and a second support plate (33) fixed to the opposite end of the filter wall, each support plate (32, 33) defining a respective portion (324, 325;335,336) of a discharge conduit (324,325; 50; 335,336) of the water which separates from the fuel during filtration of the fuel; the peculiarity of the invention consists in the fact that it comprises a connecting cannula (50) able to connect the portions (324,325;335,336) and arranged externally of the filter wall (31).

16 Claims, 4 Drawing Sheets

(52) U.S. Cl.
CPC ...... B01D 36/006 (2013.01); *B01D 2201/291* (2013.01); *B01D 2201/295* (2013.01); *B01D 2201/342* (2013.01); *B01D 2201/347* (2013.01)

(58) Field of Classification Search
CPC ........ B01D 2201/295; B01D 2201/316; B01D 29/21; B01D 29/33; B01D 29/902; B01D 35/30; B01D 29/23–29/237; B01D 29/35–29/356; B01D 2265/02; B01D 2201/29–2201/31; B01D 35/02; B01D 36/003; B01D 29/58; B01D 2201/342; B01D 2201/347
See application file for complete search history.

(56) References Cited

U.S. PATENT DOCUMENTS

| | | | |
|---|---|---|---|
| 5,788,859 A * | 8/1998 | Biere | B01D 17/10 210/312 |
| 7,731,845 B2 * | 6/2010 | Lampert | B01D 29/21 210/232 |
| 2002/0038780 A1 | 4/2002 | Jokschas et al. | |
| 2006/0163146 A1 * | 7/2006 | Girondi | B01D 36/006 210/440 |
| 2009/0218295 A1 * | 9/2009 | Verdegan | B01D 27/06 210/741 |
| 2012/0187038 A1 * | 7/2012 | Schick | B01D 29/21 210/436 |
| 2012/0223001 A1 * | 9/2012 | Beard | B01D 27/144 210/232 |
| 2012/0292252 A1 * | 11/2012 | Chase | B01D 46/003 210/634 |
| 2013/0306531 A1 * | 11/2013 | Girondi | B01D 35/147 210/130 |

FOREIGN PATENT DOCUMENTS

| | | |
|---|---|---|
| WO | 2011073012 A1 | 6/2011 |
| WO | 2012104699 A1 | 8/2012 |

* cited by examiner

FILTER CARTRIDGE PROVIDED WITH MEANS FOR EXPULSION OF WATER AND A RELATIVE FILTER GROUP

TECHNICAL FIELD

The present invention relates to a filter cartridge and a relative filter group for filtering liquids.

In general, the invention relates to a filter cartridge and the relative filter group, provided with means for expulsion of water present in the fluids to be filtered, relating to the motor field for the filtration of fuel, such as Diesel oil.

PRIOR ART

As is known, the filtration of fuel in the motor field is generally obtained by means of a filter group which comprises an external casing provided with a substantially beaker-shaped body, the open end of which is closed by a lid provided with an inlet for the liquid to be filtered and an outlet for the filtered liquid; the casing also internally contains at least a replaceable filter cartridge which subdivides the internal volume of the casing into two distinct environments, of which a first environment communicating with the inlet and a second environment communicating with the outlet.

In this way, the fuel flowing from the inlet towards the outlet of the filter group is forced to cross the filter wall, which retains the impurities that might be present therein and separates the water present in the fuel.

A typical filter cartridge comprises a tubular filter wall, for example a pleated filter wall or a depth wall, and two support plates which are fixed to the opposite ends of the filter wall.

With the aim of guaranteeing a greater rigidity and mechanical resistance of the filter wall, the cartridge sometimes also comprises a pierced support tube, usually known as a core, which is inserted into the tubular filter wall.

In this way, the support core is able to oppose deformation of the filter wall due to the pressure peaks of the fluid, as well as to vibrations, impacts and other like stresses.

As it has a specific weight that is greater than that of the fuel to be treated (for example Diesel), the water present in the liquid to be filtered tends to accumulate on the bottom of the beaker body and must therefore be removed during the functioning of the filter group.

In the prior art, to facilitate the separation of the water from the fuel, generally filter walls are used which are able to separate, by coalescence, the water from the fuel and/or hydrophobic nets which keep the water separate from the fuel, so that the water is collected by force of gravity on the bottom of the casing.

Further, the use of discharge conduits is also known, associated to the casing of the filter group, which set the lower part of the casing in communication, where the water tends to collect, with aspirating means of the water, such that the accumulated water is constantly emptied from the casing.

The discharge conduit, when not directly branching inferiorly from the bottom of the beaker body, is connected to the lid by means of a shaped cannula which axially extends internally of the casing, such that the free end thereof just grazes the beaker body.

In a first type of filter groups, the cannula branches from the lid and passes externally of the filter cartridge; however the first type has the drawback that the discharge conduit, being substantially flexible, is substantially free to move internally of the casing, with undoubted disadvantages in terms of efficacy of discharge.

To obviate these drawbacks, solutions have been proposed in which the cannula, deriving from the lid, crosses the support plates and the filter wall of the filter cartridge and opens, with the free end thereof, at the bottom of the beaker body.

However these known solutions exhibit the drawback of considerably increasing assembly costs of the various components of the filter group, with undoubted correlated disadvantages in terms of times and costs of production and maintenance.

In other adopted solutions, the discharge conduit is partially realised in the support plates and the support core located internally of the filter wall; however this solution limits the passage surface of the filtered fluid and, therefore, the overall fluid-dynamic resistance offered by the filter group to the fuel, as well as necessarily limiting the dimensions of the hydrophobic net.

An aim of the present invention is to obviate the abovementioned drawbacks, with a solution that is simple, rational and relatively inexpensive, at the same time providing an advantageous alternative with respect to the above-described systems of the prior art.

These aims are attained by the characteristics of the invention reported in the independent claim. The dependent claims delineate preferred and/or particularly advantageous aspects of the invention.

DISCLOSURE OF THE INVENTION

In particular, the invention discloses a filter wall having a tubular shape, a first support plate fixed to an end of the filter wall and a second support plate fixed to the opposite end of the filter wall, each support plate defining a respective portion of a discharge conduit of the water which separates from the fuel during filtration of the fuel, characterised in that it comprises a connecting cannula able to connect the portions and arranged externally of the filter wall.

Thanks to this solution, the means for collecting and discharging the water from the filter group are defined in a single piece with the filter cartridge, with undoubted constructional advantages, enabling compensation of each production variable of the filter cartridge and, at the same time, enabling an effective, simple and repeatable positioning of the collecting and discharging means of the water in the filter group.

Further, the positioning of the connecting cannula in the external position with respect to the filter wall does not limit the other components of the filter cartridge and constitutes a very contained fluid-dynamic disturbance for the fuel.

In an aspect of the invention, each of the portions comprises a substantially axial section parallel to the axis of the filter wall and a lateral section substantially perpendicular to the axis of the filter wall, and the connecting cannula is able to set the lateral sections of the portions in communication.

In this way, the arrangement of the connecting cannula is particularly simple and rational, facilitating the assembly and replacement thereof, and thus improving the production and maintenance cycle of the filter cartridge.

The filter cartridge of the invention advantageously comprises regulating means of the length of the connecting cannula.

In particular, the connecting cannula is provided with a bellows zone able to contract or extend according to needs, such that constructional variations of the interaxis between the lateral access mouths can be compensated by means of a change in length of the connecting cannula.

In this way, the components which constitute the filter cartridge can be standardised, maintaining a certain flexibility able to absorb any eventual variations or tolerances in the sector, due for example to the assembly of the various components.

In a further aspect of the invention, each support plate comprises seal means axially interposed between an inlet mouth and an outlet mouth of each of the portions.

Thanks to this solution, the axial end from which the water is removed is located in an environment of the filter group separate from the environment in which the lateral walls are located (and therefore the connecting cannula), enabling the water to be collected from the filtered fuel side, passing through the non-filtered side and maintaining the separation between the sides of the filter group.

Further, the filter cartridge can comprise a hydrophobic net having a tubular shape and located coaxially internally of the filter wall.

In this way the zone of the filter group in communication with the outlet of the fuel can be kept separate from an intermediate zone of water accumulation.

The filter cartridge advantageously comprises a support core coaxially inserted internally of the filter wall and provided with radial openings for fuel passage, the support core being provided with at least a rib having a helical development deriving from the external mantle of the support core and able to internally graze the filter wall.

The hydrophobic net is, further, fixed to the support core in such a way as to intercept the fuel passing through the radial opening thereof.

Thanks to this solution there is an increase and improvement of the aggregating effect of the water molecules, water separation from the fuel and precipitation thereof on the bottom of the casing of the filter group.

In a further aspect of the invention, a filter group is provided which comprises an external casing provided with an inlet for a fuel to be filtered, an outlet for the filtered fuel, and an outlet conduit of the water collected on the bottom of the casing, and a filter cartridge, as described above, able to divide the internal volume of the casing into a first chamber communicating with the inlet and a second chamber communicating with the outlet, at least one of the portions of the discharge conduit being associated to the outlet conduit.

The invention further discloses a further filter cartridge, which can also be protected independently with respect to what has been described above, which comprises:

a filter wall having a tubular shape, a first support plate fixed to an end of the filter wall and a second support plate fixed to the opposite end, of the filter wall, a hydrophobic net having a tubular shape and located coaxially with respect to the filter wall, a peculiarity of which is that it comprises a support core, coaxial with respect to the filter wall and provided with radial openings intercepted by the hydrophobic net for the passage of only the fuel, the support core being provided with at least a helically-developing rib deriving from the mantle of the support core facing the filter wall and able to internally graze the filter wall.

In practice, the hydrophobic net and the core are inserted internally of the filter wall when the filter wall is crossed by the fluid from outside towards inside, while they could be arranged externally of the filter wall when the fuel flow crosses the filter wall from inside towards the outside.

BRIEF DESCRIPTION OF THE DRAWINGS

Further characteristics and advantages of the invention will emerge from a reading of the following description, provided by way of non-limiting example, with the aid of the figures illustrated in the appended tables of drawings.

BEST WAY OF CARRYING OUT THE INVENTION

Figure 1:
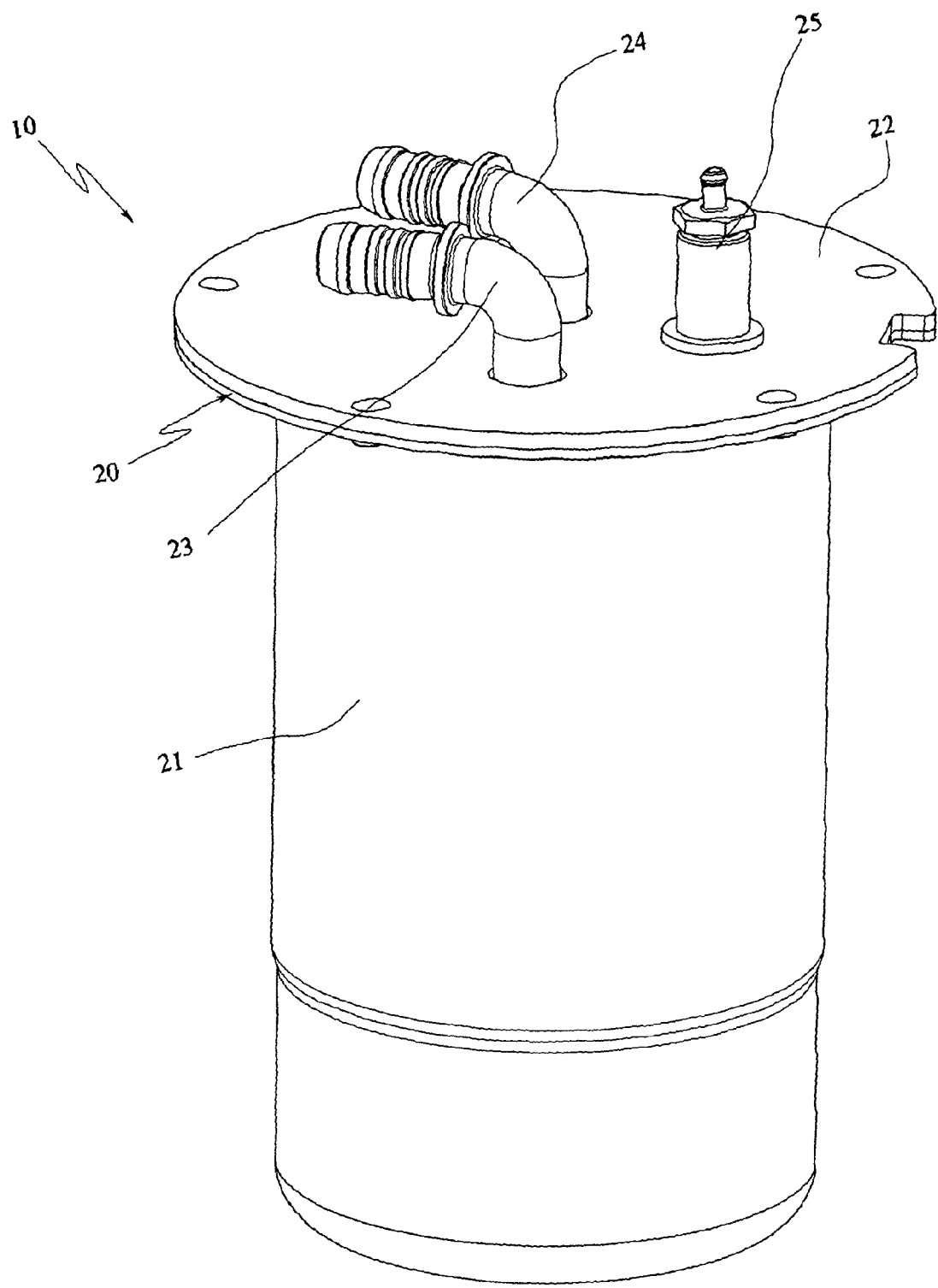
FIG. 1 is an isometric view of a filter assembly, according to the invention.
Figure 2:
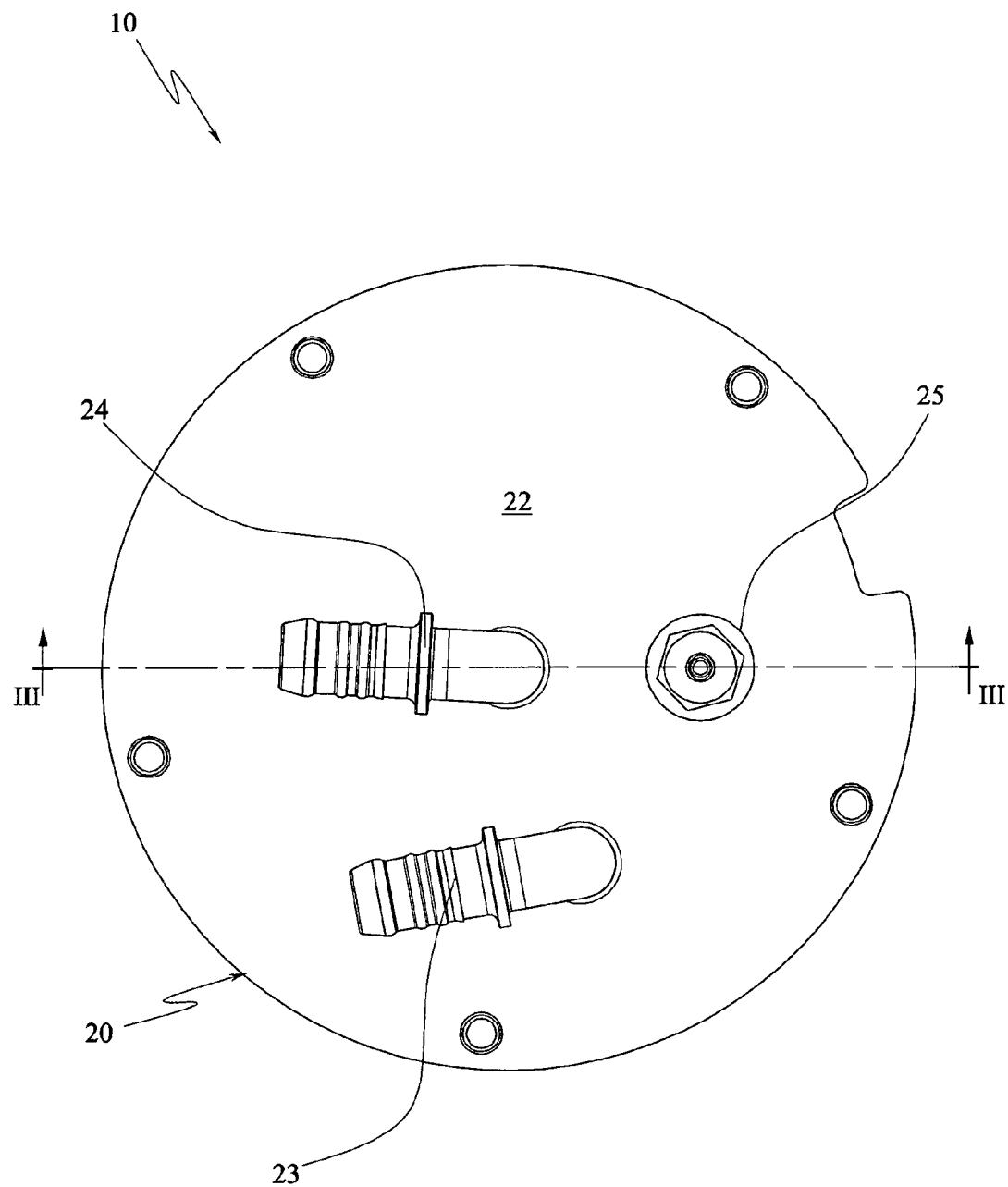
FIG. 2 is a view from above of FIG. 1.
Figure 3:
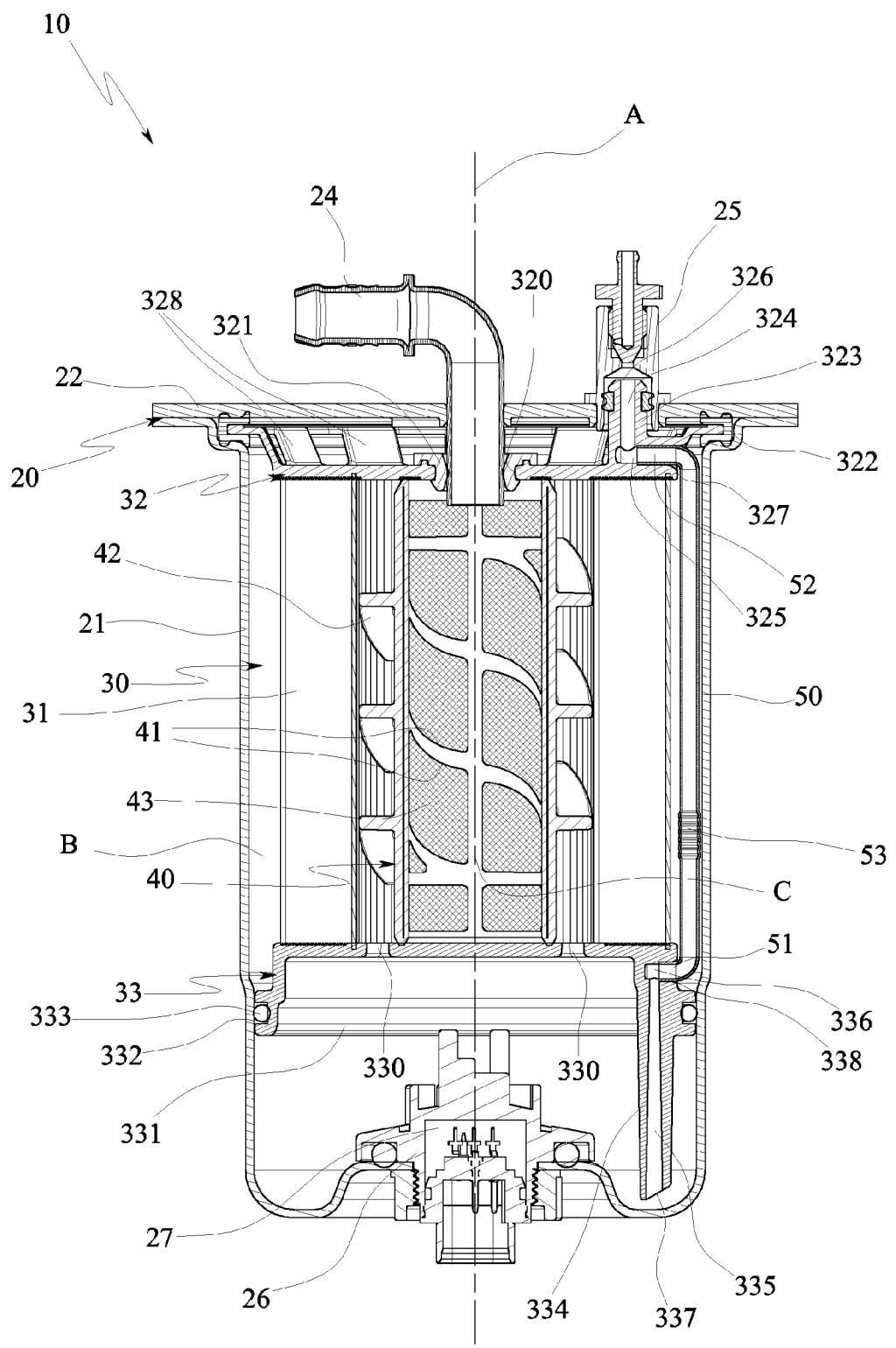
FIG. 3 is section III-III of FIG. 2.
Figure 4:
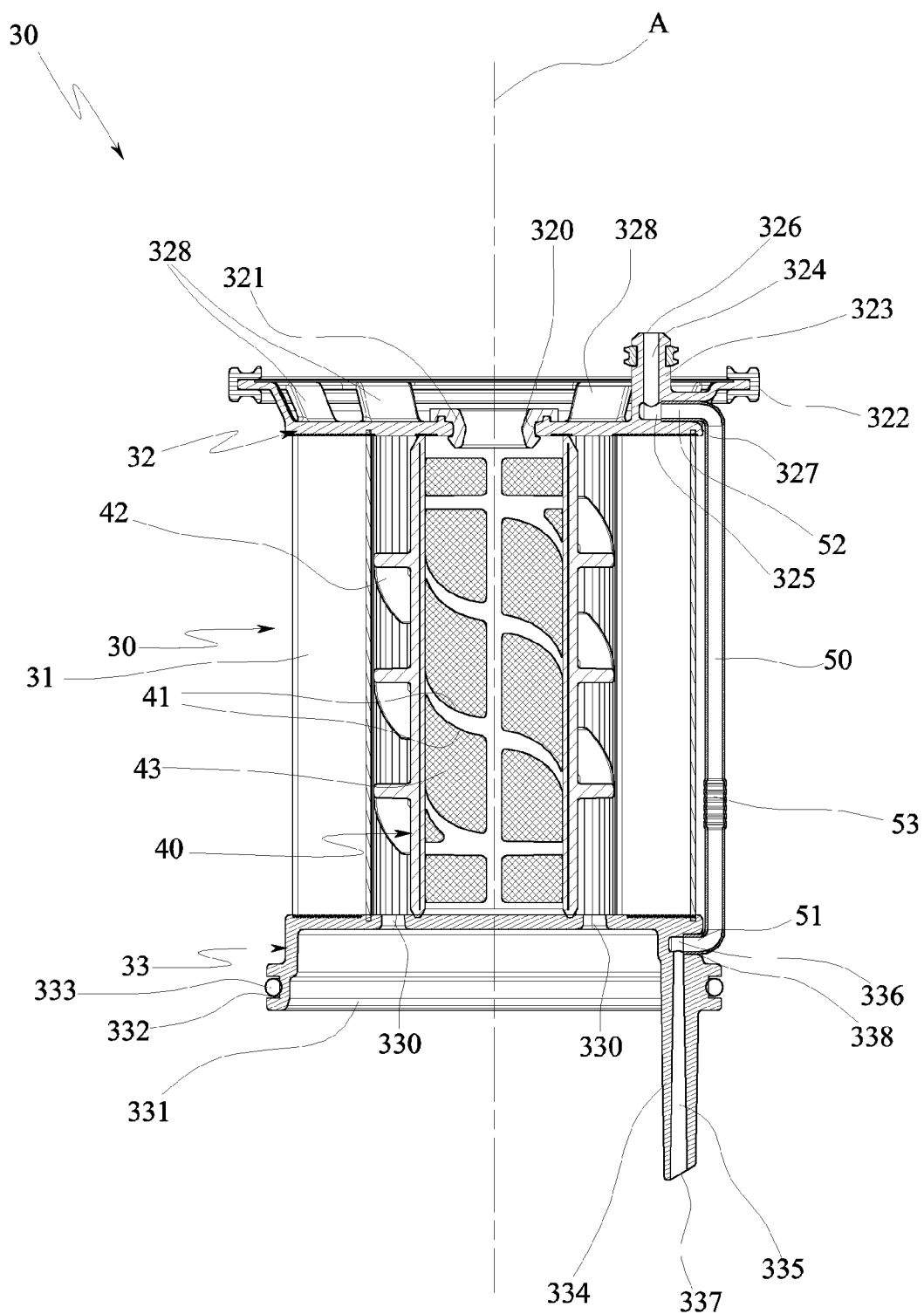
FIG. 4 is a section view of the single filter cartridge of the filter assembly of FIG. 3.

With particular reference to the figures of the drawings, reference numeral 10 denotes in its entirety a filter assembly for diesel fuel for a diesel engine of a motor vehicle.

The filter assembly 10 comprises an external casing, denoted in its entirety by 20, which is formed by a beaker-shaped body 21 and an upper lid 22 adapted to close the casing 20.

The lid 22 includes an inlet conduit 23 for the diesel oil to be filtered, an outlet conduit 24 for the filtered diesel fuel and a discharge conduit 25 for the water that accumulates on the bottom of the beaker-shaped body 21, having a suitable connecting cap, as known to experts in the sector.

A stem 26 rises from the bottom of the beaker-shaped body 21, which stem 26 bears a level sensor 27 able to detect the level of water which accumulates on the bottom of the beaker-shaped body 21 during the filtration of the diesel fuel.

The level sensor 27 is associated, as known to experts in the field, to an electronic control unit (not shown) of the vehicle.

A filter cartridge is accommodated inside the housing 20, denoted by reference numeral 30.

The filter cartridge 30 includes a tubular filter wall 31, in this case pleated, which delimits an internal through-cavity in which a support core 40 is inserted, which core 40 is provided with radial openings 41 for the passage of diesel.

An external volume is defined between the filter wall 31 and the beaker-shaped body 21, which can be placed in communication with the inlet conduit 23 of the fuel to be filtered.

The support core 40 has an external diameter that is substantially smaller than the internal diameter of the filter wall 31, so that an interspace is defined between the internal surface of the filter wall 31 and the external surface of the support core 40.

A rib 42 is fashioned on the external mantle of the support core 40 having a helical development, a crest of which grazes against the internal surface of the filter wall 31.

Further, the support core 40 is able to support a hydrophobic net 43, for example also exhibiting a tubular shape, coaxially inserted inside the filter wall 31 and able to be superposed on the radial openings 41 of the support core 40, so as to intercept the flow of fuel passing there-through.

In practice the hydrophobic net 43 is fixed to the support core 40 of support 40 by gluing or another fastening technology, so as to intercept each radial opening 41 of the core 40.

The rib 42 is able to impart a helical motion to the fuel filtered by the filter wall 30 and the water separated from it, which increases the separation of the water from the fuel and the aggregation of the water molecules, thus facilitating the task of the hydrophobic net 43.

The filter cartridge 30 comprises two discoid support plates, generally made of plastic, of which an upper support plate 32 and a lower support plate 33, which are coaxially fixed to the opposite ends of the filter wall 31.

The lower support plate 33 closes the lower end of the filter wall 31 and is provided with axial openings 330 aligned along an imaginary circumference and able to be superposed in plan view on the interspace defined between the filter wall 31 and the external mantle of the support core 40.

In addition, the lower support plate 33 comprises a lowered edge 331 able to define an annular seating 332 in which a first annular gasket 333 is contained.

The first annular gasket 333 can be compressed between the annular seating 332 and the internal wall of the beaker-shaped body 21, for example at a tapered region thereof located in proximity of the bottom, so as to ensure the hermetic seal between the lower support plate 33 and the beaker-shaped body 21, inferiorly delimiting the volume external of the filter wall 31.

In practice the first annular seal 333 sub-divides the internal volume of the casing 20 into a first environment (B) (also called the dirty side of the filter assembly 10, since fuel still to be filtered and to be separated from the water is contained therein) located upstream of the filter wall 31 in the flow direction of the fuel from the inlet conduit 23 to the outlet conduit 24, and a second environment (C) located downstream of the filter wall itself (also called the clean side of the filter assembly 10, in which the fuel has been filtered through the filter wall 31).

The first environment (B) of the filter assembly 10 is placed in communication only with the inlet conduit 23, as will become apparent in the following.

The second environment (C) is then sub-divided by the hydrophobic net 43 into two sub-environments, the first of which is composed of the volume comprised between the internal surface of the filter wall 31 and the hydrophobic net as well as the volume located below the lower support plate 33 (which volumes communicated through the axial openings 330) and is set in communication with the outlet conduit 25 of the water.

The second sub-environment is defined by the internal volume of the hydrophobic net 43 and is placed in direct communication with the outlet conduit 24 of the filtered fuel.

A hollow cannula 334 located in an offset position branches from the lower support plate 33, a free end of which grazes the bottom of the beaker-shaped body 21. In the example, the hollow cannula 334 is in a single body with the lower support plate 33, for example made by co-extrusion.

The internal cavity of the hollow cannula 334 defines a longitudinal through-conduit (335, 336) which opens, at the free end of the hollow cannula 334, via a first inlet hole 337 and, at a lateral flank of the lower support plate 33, via a first lateral outlet 338.

The free end of the hollow cannula 334 is advantageously shaped substantially obliquely, i.e. having a front wall inclined by about 45° with respect to the longitudinal axis (A) of the filter wall 31.

The first annular gasket 333 is suitable for being interposed axially between the first inlet mouth 337 and the first outlet mouth 338.

In practice, the longitudinal conduit comprises a substantially axial first portion 335 (parallel to the longitudinal axis (A) of the filter wall 31) and a lateral perpendicular second portion 336 (e.g. radial) with respect to the first section.

The upper support plate 32 includes a central hole 320 for coupling with the outlet conduit 24 that protrudes to inside the casing 20, by interposing of a second annular gasket 321, and a slightly-raised perimeter edge to which a third annular gasket 322 is tightly coupled.

The third annular seal 322 is received and compressed internally of a seating defined between the lid 22 and the beaker-shaped body 21, so as to ensure the sealing of the housing 20 of the filter assembly 10.

The upper support plate 32 further comprises an offset hollow shank 323 which is inserted, with the interposing of a seal ring, in a broadened section of the outlet conduit 25.

In the present example, the hollow shank 323 is in a single piece with the upper support plate 32.

The internal cavity of the hollow shank 323 defines a longitudinal conduit (324, 325) which opens at the free end of the hollow shank 323, via a second outlet mouth 326 and, at a lateral flank of the upper support plate 32, via a second lateral inlet mouth 327.

The third annular gasket 322 can be axially interposed between the second outlet mouth 326 and the second inlet mouth 327.

In practice, the longitudinal conduit comprises a substantially axial first portion 324 (parallel to the longitudinal axis (A) of the filter wall 31) and a lateral—i.e. perpendicular—second portion 325 (e.g. radial) with respect to the first section itself.

The second inlet mouth 327 of the upper support plate 32 and the first outlet mouth 338 of the lower support plate 33 are advantageously substantially aligned in plan view.

A narrow chamber is defined between the upper support plate 32 and the lid 22, which chamber communicates with the inlet conduit 23 of the diesel fuel to be filtered.

Further, a plurality of apertures 328 is defined on the raised edge of the upper support plate 32, which apertures set the inlet conduit 23 in communication with the external volume defined between the filter wall 31 and the beaker-shaped body 21.

In particular, the filter cartridge 30 includes a connecting cannula 50 which connects the longitudinal conduit 335, 336 of the lower support plate 33 with the longitudinal conduit 324, 325 of the upper support plate 32.

In practice, the connecting cannula 50 comprises a lower end 51, suitable for sealedly inserting (for example by friction interference) in the first outlet mouth 338 (of the second lateral portion 336 side) of the lower support plate 33, and an upper end 52, suitable for sealedly inserting (for example by friction interference) in the second inlet mouth 327 (of the second lateral portion 325) of the upper support plate 32.

The connecting cannula 50 comprises a central portion that can be arranged parallel to the longitudinal axis (A) of the filter wall 31 and externally thereto and two end portions, substantially perpendicular to the central section, inserted (as described above) in the second inlet mouth 327 and in the first outlet mouth 338 of the respective support plates, so as to define, together with the longitudinal conduits 335, 336 and 324, 325, a single outlet conduit of the water that accumulates, during the fuel filtration, on the bottom of the beaker-shaped body 21.

In practice the outlet mouth of the water is defined by:
a first portion in a single piece with the lower support plate 33 which is made up of the hollow cannula 334 (first portion 335 and second portion 336 of the longitudinal conduit), a second portion composed of the connecting cannula 50 and a third portion in a single piece with the upper support plate 32 which is made up of the hollow shank 323 (first portion 324 and second portion 325 of the longitudinal conduit).

The connecting cannula 50, for example, is removably associated to the lower support plate 33 and the upper support plate 32.

The central portion of the connecting cannula 50 advantageously comprises a bellows zone 53 able to vary the length of the connecting cannula and compensate, therefore, any changes in the distance between the second inlet port 327 and the first outlet 338 due to the manufacturing process of the filter cartridges 10.

In the light of the foregoing description, the operation of the filter assembly 10 is as follows.

The fuel to be filtered enters the casing 20 through the inlet conduit 23 and is conveyed towards the filter wall 31 which enables the separation of water (for example as a result of coalescence) as well as the filtration of the fuel.

The separated water and the fuel filtered by the filter wall 31 are given a downwards whirling motion by the rib, towards the centre of the housing 20 which pushes it towards the hydrophobic net 43.

The separated water is then blocked by the hydrophobic net 43 and, as the specific weight thereof is greater than that of the fuel, it tends to deposit on the bottom of the beaker-shaped body 21, passing through the axial openings 330.

The fuel, filtered and separated from the water, passes through the hydrophobic net 43 and is conveyed towards the outlet conduit 24 of the fuel. When it reaches a sufficiently high level, the water which settles on the bottom of the beaker-shaped body 21, detected by the level sensor 27, is discharged towards the outlet conduit 25, through the discharge conduit.

In practice, the water is collected via the first inlet mouth 337 of the hollow cannula 334 and is sucked towards the outlet conduit 25.

The water passes in sequence through the longitudinal conduit 335, 336 defined in the lower support plate 33, the connecting cannula 50 and the longitudinal conduit 324, 325 defined in the upper support plate 32, and then exits from the second outlet mouth 326 and reaches the outlet conduit 25, thence to be discharged to the outside of the filter assembly 10.

The invention as it is conceived herein is susceptible to numerous modifications and variations, all falling within the inventive concept.

Moreover, all the details can be replaced by other technically equivalent elements.

In practice, the materials used, as well as the contingent shapes and dimensions, may be any according to requirements without thereby abandoning the scope of protection of the following claims.

The invention claimed is:

1. A filter cartridge (30) for filtering fuel, comprising:
a filter wall (31) having a tubular shape,
a first support plate (32) fixed to an end of the filter wall (31),
a second support plate (33) directly fixed to the opposite end of the filter wall (31),
a first conduit (324, 325) realized in the first support plate (32) and a second conduit (335, 336) realized in the second support plate (33) for discharging water which separates from the fuel during filtration of the fuel,
wherein the first conduit (324, 325) comprises an inlet mouth (327) and an outlet mouth (326),
wherein the second conduit (335, 336) comprises an inlet mouth (337) and an outlet mouth (338),
wherein the filter cartridge (30) further includes a connecting cannula (50) arranged externally of the filter wall (31) for connecting the first conduit (324, 325) to the second conduit (335, 336), and
wherein the connecting cannula (50) comprises a first end (51) sealingly inserted in the outlet mouth (338) of the second conduit (335, 336) and a second end (52) sealingly inserted in the inlet mouth (327) of the first conduit (324, 325).

2. The filter cartridge (30) of claim 1, wherein
the first conduit (324, 325) comprises a substantially axial section (324) parallel to a longitudinal axis (A) of the filter wall (31) and a lateral section (325) substantially perpendicular to the axis of the filter wall (31);
wherein
the second conduit (335, 336) comprises a substantially axial section (335) parallel to the longitudinal axis (A) of the filter wall (31) and a lateral section (326) substantially perpendicular to the axis of the filter wall (31),
and wherein
the connecting cannula (50) sets the lateral sections (325) of the first conduit (324, 325) in communication with the lateral section (326) of the second conduit (335, 336).

3. The filter cartridge (30) of claim 1 further comprising regulating means (53) of the length of the connecting cannula (50).

4. The filter cartridge (30) of claim 3, wherein the regulating means comprise at least a bellows zone (53) of the connecting cannula (50).

5. The filter cartridge (50) of claim 2, wherein
the first support plate (32) comprises a seal (322) axially interposed between the inlet mouth (327) and the outlet mouth (326) of the first conduit (324, 325).

6. The filter cartridge (30) of claim 1, further comprising at least a hydrophobic net (43) having a tubular shape and located coaxially internally of the filter wall (31).

7. The filter cartridge (30) of claim 1, further comprising a support core (40) coaxially inserted internally of the filter wall (31) and provided with radial openings (41) for fuel passage, the support core (40) being provided with at least a rib (42) having a helical development deriving from an external mantle of the support core and able to internally graze the filter wall (31).

8. The filter cartridge (30) of claim 6, wherein the hydrophobic net (43) is fixed to a support core (40) coaxially inserted internally of the filter wall (31) and provided with radial openings (41) for fuel passage in such a way as to intercept the fuel passing through the radial opening (41) thereof.

9. A filter group (10) comprising an external casing (20) provided with an inlet (23) for a fuel to be filtered, an outlet (24) for the filtered fuel, and an outlet conduit (25) of water collected on a bottom of the external casing, and a filter cartridge (30), according to claim 1, configured to divide an internal volume of the casing (20) into a first environment (B) communicating with the inlet (23) and a second environment (C) communicating with the outlet (24), the first conduit (324, 325) filter cartridge (30) being connected to the outlet conduit (25).

10. The filter group (10) of claim 9, wherein the casing (20) comprises a body (21), substantially cup-shaped and superiorly closed by a lid (22), and the inlet (23), the outlet (24) and the outlet conduit (25) being realised at the lid (22).

11. The filter group (10) of claim 9, wherein
the first support plate (32) of the filter cartridge (30) comprises a seal (322) axially interposed between the inlet mouth (327) and the outlet mouth (326) of the first conduit (324, 325),
wherein
the second support plate (33) of the filter cartridge (30) comprises a seal (333) interposed between inlet mouth (337) and the outlet mouth (338) of the second conduit (335, 336),
and wherein the seals (322, 333) of the filter cartridge (30) cooperate with the casing (20) in separating the first environment (B) of the fluid to be filtered from the second environment (C) of the filtered fluid.

12. The filter cartridge (30) of claim 1, wherein:
the first support plate (32) comprises an offset hollow shank (323),
wherein
an internal cavity of the hollow shank (323) defines the first conduit (324, 325)
wherein
the first conduit (324, 325) opens, at an upper free end of the hollow shank (323), via the respective outlet mouth (326), and, at a lateral flank of the first support plate (32), via the respective inlet mouth (327), and wherein the second end (52) of the connecting cannula (50) is sealingly inserted in the inlet mouth (327) of the hollow shank (323).

13. The filter cartridge (30) of claim 1, wherein:
the second support plate (33) comprises a hollow cannula (334) located in an offset position,
wherein
an internal cavity of the hollow cannula (334) defines the second conduit (335, 336)
wherein
the second conduit (335, 336) opens, at a lower free end of the hollow cannula (334), via the respective inlet mouth (337) and, at a lateral flank of the second support plate (33), via the respective outlet mouth (338),
and wherein
the first end (51) of the connecting cannula (50) is sealingly inserted in the outlet mouth (338) of the hollow cannula (334).

14. The filter group (10) of claim 9, wherein
the first support plate (32) comprises an offset hollow shank (323),
wherein
an internal cavity of the hollow shank (323) defines the first conduit (324, 325),
wherein
the first conduit (324, 325) opens, at an upper free end of the hollow shank (323), via the respective outlet mouth (326), and, at a lateral flank of the first support plate (32), via the respective inlet mouth (327),
wherein
the second end (52) of the connecting cannula (50) is sealingly inserted in the inlet mouth (327) of the hollow shank (323)
and wherein
the upper free end of the hollow shank (323) is inserted, with the interposing of a seal ring, in a broadened section of the outlet conduit (25) of the external casing (20).

15. The filter group (10) of claim 10, wherein
the the second support plate (33) comprises a hollow cannula (334) located in an offset position,
wherein
an internal cavity of the hollow cannula (334) defines the second conduit (335, 336),
wherein
the second conduit (335, 336) opens, at a lower free end of the hollow cannula (334), via the respective inlet mouth (337) and, at a lateral flank of the second support plate (33), via the respective outlet mouth (338),
wherein
the first end (51) of the connecting cannula (50) is sealingly inserted in the outlet mouth (338) of the hollow cannula (334)
and wherein
the lower free end of the hollow cannula (334) grazes a bottom of the cup-shaped body (21).

16. The filter cartridge (30) of claim 1, wherein the first end (51) of the connecting cannula (50) is inserted in the outlet mouth (338) of the second conduit (335, 336) by friction interference and the second end (52) of the connecting cannula (50) is sealingly inserted in the inlet mouth (327) of the first conduit (324, 325) by friction interference.

* * * * *